No. 823,085. PATENTED JUNE 12, 1906.
C. L. TAYLOR.
CLUTCH OPERATING MECHANISM.
APPLICATION FILED APR. 18, 1903.

3 SHEETS—SHEET 2.

WITNESSES
E. Nottingham
G. F. Downing

INVENTOR
C. L. Taylor
By H. A. Seymour
Attorney

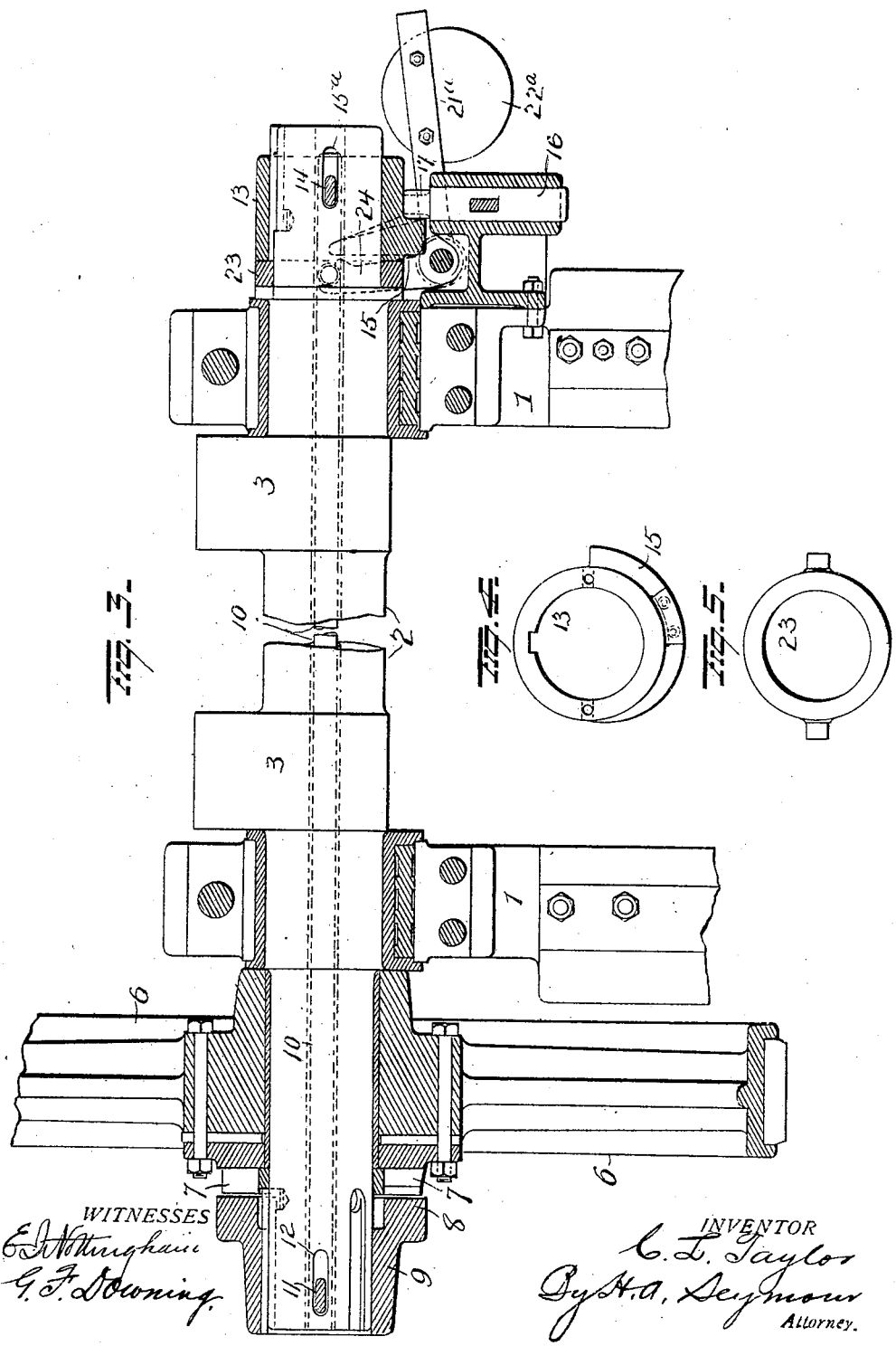

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

CLUTCH-OPERATING MECHANISM.

No. 823,085.   Specification of Letters Patent.   Patented June 12, 1906.

Application filed April 18, 1903. Serial No. 153,300.

*To all whom it may concern:*

Be it known that I, CLARENCE L. TAYLOR, of Alliance, in the county of Stark and State of Ohio, have invented certain new and useful Improvements in Clutch-Operating Mechanism; and I do hereby declare the following to be a full, clear, and exact description of the invention, such as will enable others skilled in the art to which it appertains to make and use the same.

My invention relates to an improvement in starting and stopping mechanism designed particularly for use on heavy machinery—such as shears, punching-machines, &c.—the object being to provide devices for automatically cutting off the power from the tool-actuating shaft at the completion of each full stroke of the tool actuated by the shaft; and it consists in the parts and combination of parts and in the details of construction, as will be more fully described, and pointed out in the claims.

Figure 1:
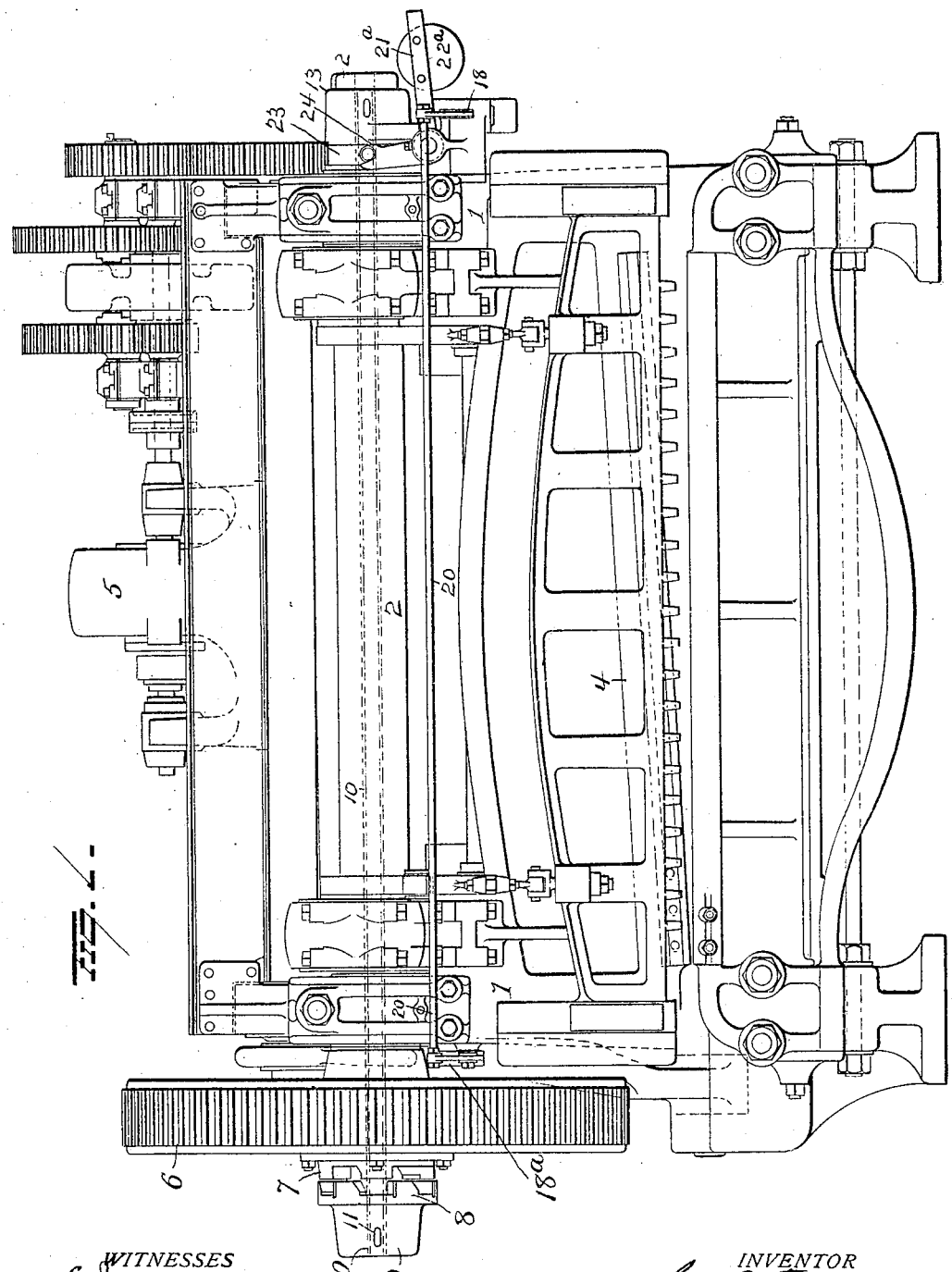
Figure 2:
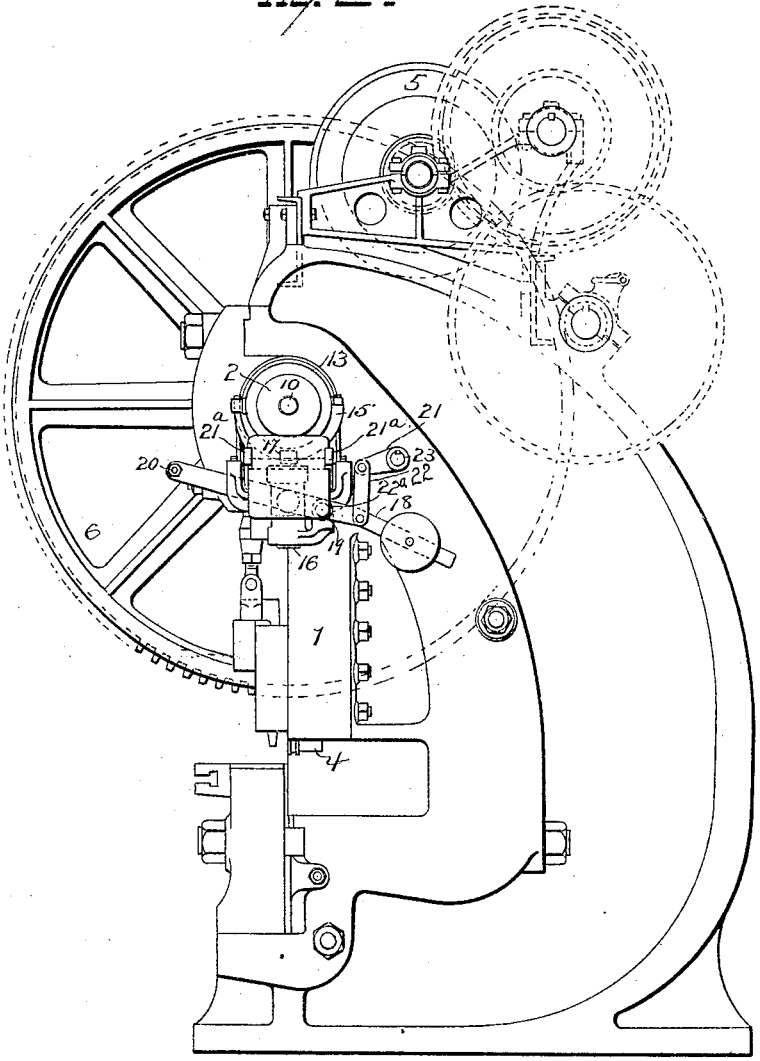

In the accompanying drawings, Figure 1 is a view in front elevation of a plate-shear embodying my invention. Fig. 2 is an end view of the same. Fig. 3 is an enlarged view, partly in elevation and partly in section, of the tool-actuating shaft, clutch, and clutch-operating mechanism. Fig. 4 is a view in elevation of the cam-sleeve, and Fig. 5 is a view of the sleeve-shifting ring.

In the drawings I have shown an electric shear for cutting metal plates; but I would have it distinctly understood that the improvement is equally applicable to all other machines of a similar character where it is necessary or desirable to automatically disconnect the tool-actuating shaft from the source of power at the completion of each stroke of the tool. Hence I do not limit the application of my improvement to any particular class of machines.

1 represents the machine-frame, and 2 the tool-actuating shaft mounted therein. This shaft 2 is provided with the cams 3, which impart movement and power to the shear 4, and is driven by a motor 5 and a train of gearing, the toothed pinion 6 of the latter being loosely mounted on the end of shaft 2. The hub of this pinion 6 is provided on its outer face with clutch-teeth 7, which latter are adapted to engage the clutch-teeth 8 on the sliding clutch 9. This clutch 9 is keyed to the end of the shaft adjacent to wheel 6 so as to slide thereon, but being keyed is held against any rotary movement independent of the shaft 2.

Extending longitudinally through a bore in the shaft 2 is the clutch-actuating rod 10. This rod is approximately the length of the shaft and is connected at its end adjacent to clutch 9 to said clutch by a flat bar 11, which latter passes through an elongated slot 12 in shaft 2 and is secured at its ends to the clutch 9. From this it is evident that if the rod 10 be moved longitudinally in one direction the clutch 9 will be moved away from the clutch-teeth 7 on pinion 6 or into the position shown in Fig. 3, and if moved in the opposite direction the teeth 8 on clutch 9 will be moved into engagement with the teeth 7 on wheel 6.

On the end of shaft 2 farthest removed from clutch 9 is the sleeve 13. This sleeve is keyed to shaft so as to revolve therewith, but is free to move longitudinally thereon and is connected to the clutch-actuating rod 10 by the bar 14, which latter passes through an elongated slot 15 in shaft 2. The sleeve 13 and clutch 9 are coupled up by the rod 10 and the bars 11 and 14, so as to move in unison. Hence when sleeve 13 is moved in either direction it follows that the clutch must move simultaneously therewith and in the same direction. The sleeve 13 is provided, as clearly shown in Figs. 3 and 4, with a cam-flange 15, extending partly around the same.

Mounted in the frame 1 of the machine is the vertically-sliding stud 16, provided at its upper end with an antifriction-roller 17. This roller normally rests with its top close to the sleeve 13 and in the path of the cam-flange 15, so that as the shaft 2, with the sleeve 13 thereon, is revolved the cam-flange 15 on sleeve 13 engages antifriction-roller 17 and are forced inwardly, carrying with them the rod 10 and the clutch 9, which movement results in a release of the pinion 6 from the clutch and the consequent stoppage of rotation of shaft 2.

The stud 16 is, as before stated, mounted in the frame of the machine and is normally retained in its highest position or in a position to engage the flange 15 by the weighted lever 18. This lever is pivoted to the frame at 19 and passes through an elongated slot in the support carrying the stud and through the latter to a point in front of the machine.

A lever 18ª, similar to lever 18, is pivoted to the opposite end of the machine, and the two levers thus located and arranged are connected in front by the operating rod or bar 20 and at the rear by levers 21 and links 22 with the shaft 23, whereby the levers 18 at the two ends are caused to move in unison. The shaft 23 runs lengthwise the machine, and it together with levers 21 and links 22 (which are shown at one end only) are simply for the purpose of maintaining the levers 18 in the same relative position and for causing them to move in unison, thus supporting the operating-rod in a horizontal position at all times.

Pivotally secured to the frame of the machine is the bell-crank lever 21ª. The horizontal member of this lever 21 is bifurcated to receive the weight 22ª, while the vertical member 24 is also bifurcated and forms a yoke which straddles the ring 23, located on shaft 2 behind the sleeve 13. This sleeve is provided at diametrically opposite points with studs or projections engaged by the arms of the vertical member 24 of the lever 21. Hence when the latter is free to act the weight 22 swings the horizontal member of the lever 21 downwardly and the vertical member outwardly, thus shifting sleeve 13, rod 10, and clutch 9, and causing the teeth of the latter to engage the teeth of the hub of pinion 6 and transmit the movement of the latter to the shaft 2. As shaft 2 revolves it carries with it the sleeve, and as the latter revolves the cam-flange thereon engages the antifriction-roller 17 of stud 16 and forces the sleeve 13, rod 10, and clutch 9 longitudinally, thus disengaging the clutch from the pinion 6. To again start the shaft 2, it is simply necessary for the operator to grasp the rod 20 and depress same, thus moving the antifriction-roller on stud 16 out of the path of the flange 15 on sleeve 13 and permitting the weight 22ª to move the sleeve 13 outwardly. This outward movement of the sleeve carries with it the rod 10 and clutch 9 and forces the latter into engagement with the teeth 7 on the hub of pinion 6 and starts the machine up.

With the construction shown it is intended that the pinion 6 shall revolve continuously and on the shaft 2 and only transmit motion to the latter at intervals when the clutch is applied.

It is evident that many slight changes might be resorted to in the relative arrangement of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. The combination with a shaft, of a pinion loose thereon, a sliding clutch also mounted on said shaft and adapted to lock the pinion to the shaft, a rod extending lengthwise through the shaft and connected at one end with the clutch, and means connected near the opposite end of the rod for automatically shifting the latter, once during each revolution of the shaft, in a direction to disengage the clutch and pinion thus automatically stopping the shaft after a complete revolution, substantially as set forth.

2. The combination with a shaft, of a pinion loose thereon, a sliding clutch adapted to engage said pinion, a movable rod passing through said shaft and connected near one end with the clutch, means engaging the rod near its opposite end for automatically shifting it, once during each revolution of the shaft, in a direction to disengage the clutch and pinion thus automatically stopping the shaft after a complete revolution and means for moving rod in the opposite direction.

3. The combination with a shaft, of a pinion loose thereon, a clutch for locking the pinion to the shaft, a sliding rod centrally within the shaft, a connection between the rod near one end of the latter and the clutch, automatic means located adjacent the opposite end of the rod and actuated by the rotation of the shaft for unclutching the pinion at the end of each revolution of the shaft thereby stopping the revolution of the shaft after each complete revolution and means for moving the clutch in a direction to engage the pinion.

4. The combination with a shaft, of a pinion loose thereon, a clutch for locking the pinion to the shaft, a sliding rod centrally within the shaft and connected near one end to the clutch, automatic devices actuated by the rotation of the shaft and engaging the rod for moving the rod in a direction to disconnect the clutch from the pinion thereby stopping the shaft after one complete revolution and manually-actuated means for releasing the clutch and automatic means for restoring the clutch to its position in engagement with the pinion.

5. The combination with a shaft, of a pinion loose thereon, a clutch for locking the pinion to the shaft, a rod located within the shaft and connected to the clutch, a sleeve on the shaft, the sleeve being provided with a cam-flange, means connecting the sleeve and sliding rod, a stud normally resting in the path of the flange for moving the sleeve and disconnecting the pinion and clutch once in each revolution of the shaft and means for disengaging the stud and flange.

6. The combination with a shaft, pinion, and clutch, of a sliding sleeve mounted on the shaft and having a cam-flange, means connecting the sliding sleeve and clutch, a stud normally in the path of the cam-flange for moving the sleeve and disconnecting the clutch and pinion once in each revolution of the shaft, means for disengaging the stud from the flange, and means for moving the sleeve longitudinally when the parts are thus disengaged.

7. The combination with a shaft, pinion and clutch, of a sliding sleeve mounted on the shaft and provided with a cam-flange, means connecting the sliding sleeve and clutch, a stud normally in the path of the cam-flange for moving the sleeve longitudinally in a direction to disengage the clutch and pinion once in each revolution of the shaft and a weighted lever for moving said sleeve in the opposite direction.

8. The combination with a shaft, pinion and clutch, of a sliding sleeve mounted on the shaft and provided with a cam-flange, means connecting the sleeve and clutch, a stud normally in the path of the cam-flange for moving the sleeve longitudinally in a direction to disengage the clutch and pinion once in each revolution of the shaft, means for disengaging the stud from the flange, and a weighted lever connected with the sleeve for moving the latter longitudinally in the opposite direction.

In testimony whereof I have signed this specification in the presence of two subscribing witnesses.

CLARENCE L. TAYLOR.

Witnesses:
  NORMAN C. FETTERS,
  A. L. ROBERTS.